United States Patent Office.

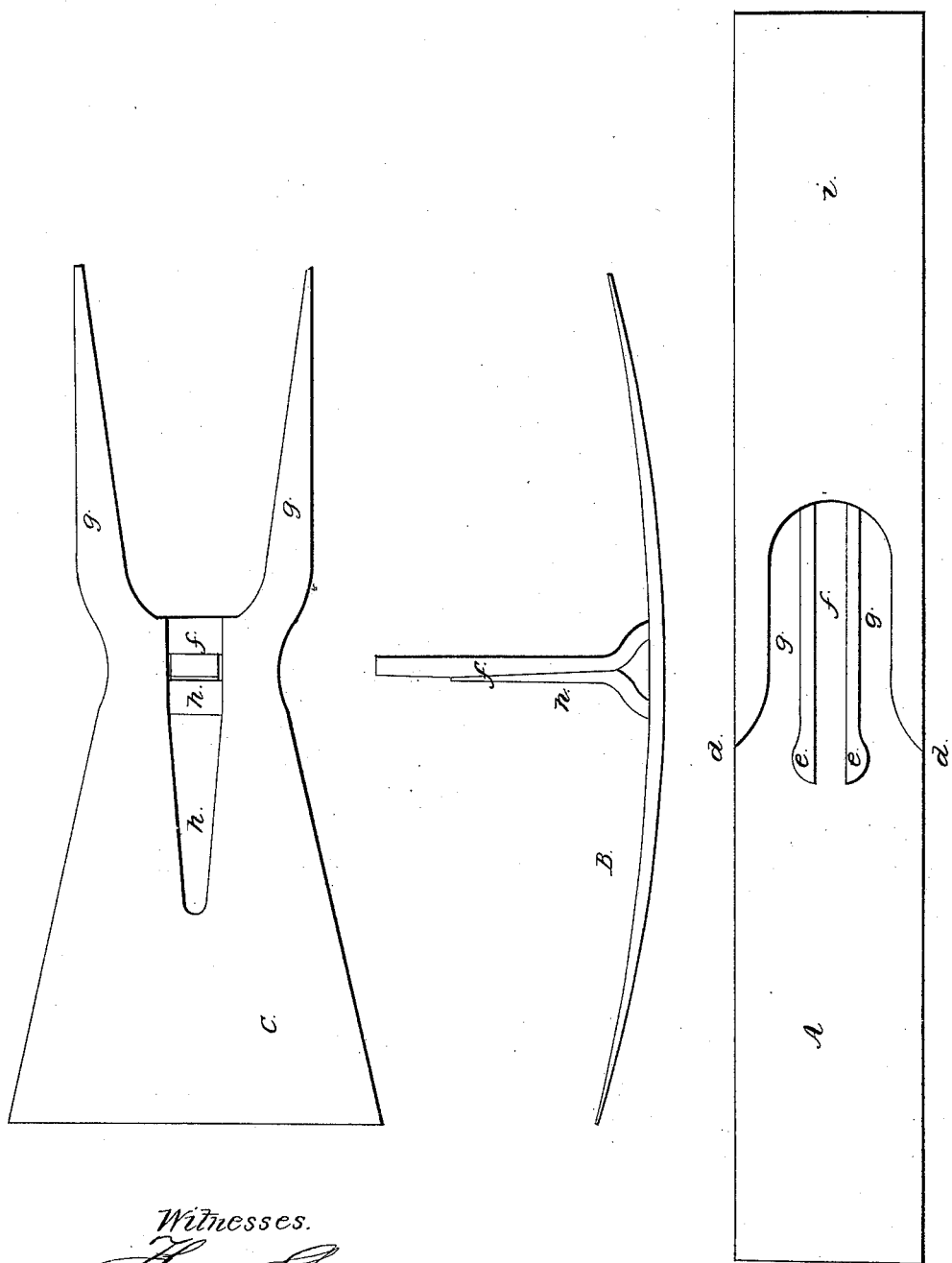

IMPROVEMENT IN THE MANUFACTURE OF HOES.

REUBEN HARPER, OF PHILADELPHIA, PA.

Letters Patent No. 59,744, dated November 20, 1866.

SPECIFICATION.

TO ALL WHOM IT MAY CONCERN:

Be it known that I, REUBEN HARPER, of the city and county of Philadelphia, Pennsylvania, have invented a new and improved mode of manufacturing hoes, and I hereby declare the following to be a full, clear, and exact description of the same, reference being had to the accompanying drawings and to the letters of reference marked thereon. My invention consists in the manner of cutting out the metal and in forming the shank, as hereafter described. In order to enable others to use and practice my invention, I will proceed to describe its construction.

On reference to the accompanying drawing, which forms a part of the specification, fig. A represents a piece of metal three-sixteenths of an inch thick and of the proper size to make two hoes, and is cut in two pieces by a stamp of a configurature to cut line $d\,d$, and spaces $e\,e$, after which separation the part $i$ is of the proper shape to make an ordinary hoe with rivet shank, (after having the points and blade hammered to proper shape.) The part A will make a hoe like figs. B and C; the shank being formed by the bending up of the tongue $f$, as shown in fig. B, and by the stamping out and bending up of a tongue $h$, as shown in fig. C, the tongues combine to form a shank upon which an ordinary handle can be driven.

The object of the invention is to save metal by stamping out plates in rough, as shown in fig. A, and to utilize metal and save expense of riveted shank, by forming a shank out of the metal of the hoe as shown in fig. B, producing a stronger shank.

What I claim, and desire to secure by Letters Patent, is—

The stamping of the plates and the forming of the shank in the manner and for the purpose substantially as set forth.

REUBEN HARPER.

Witnesses:
 THOMAS SHAW,
 GEO. R. TAYLOR.